(12) United States Patent
Harikrishnasamy et al.

(10) Patent No.: US 11,725,869 B2
(45) Date of Patent: Aug. 15, 2023

(54) CABINET REINFORCING ASSEMBLY

(71) Applicant: WHIRLPOOL CORPORATION, Benton Harbor, MI (US)

(72) Inventors: Arunkumar Harikrishnasamy, Stevensville, MI (US); Lynne F. Hunter, Dorr, MI (US); Abhay Naik, Stevensville, MI (US); Sanket Vivek Phalak, Pune (IN); Aaron Michael Stewart, Buchanan, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/483,131

(22) Filed: Sep. 23, 2021

(65) Prior Publication Data

US 2022/0011041 A1 Jan. 13, 2022

Related U.S. Application Data

(62) Division of application No. 16/744,872, filed on Jan. 16, 2020, now Pat. No. 11,150,008.

(51) Int. Cl.
*F25D 23/06* (2006.01)
*F25D 21/04* (2006.01)

(52) U.S. Cl.
CPC ........... *F25D 23/067* (2013.01); *F25D 21/04* (2013.01); *F25D 23/062* (2013.01); *F25D 23/065* (2013.01); *F25D 23/069* (2013.01); *F25D 2201/14* (2013.01); *F25D 2323/024* (2013.01); *F25D 2323/06* (2013.01); *F25D 2400/04* (2013.01)

(58) Field of Classification Search
CPC .... F25D 23/062; F25D 23/065; F25D 23/067; F25D 23/069; F25D 21/04; F25D 2201/14; F25D 2323/024; F25D 2323/06; F25D 2400/04
See application file for complete search history.

(56) References Cited

U.S. PATENT DOCUMENTS

| | | |
|---|---|---|
| 1,588,707 A | 6/1926 | Csiga |
| 1,814,114 A | 7/1931 | Bodman |
| 1,845,353 A | 2/1932 | Snell |
| 2,000,882 A | 5/1935 | Comstock |
| 2,660,505 A | 11/1953 | Eck |
| 2,675,937 A | 4/1954 | Philipp |

(Continued)

FOREIGN PATENT DOCUMENTS

| | | | |
|---|---|---|---|
| CN | 103363769 B | 6/2015 | |
| DE | 102011101677 A1 * | 11/2012 | ........... F25D 23/062 |

(Continued)

*Primary Examiner* — Andrew M Roersma
(74) *Attorney, Agent, or Firm* — Price Heneveld LLP

(57) ABSTRACT

A cabinet of an appliance includes an outer wrapper defining opposing first and second sidewalls, a rear wall coupling the first and second sidewalls and an access opening and an inner liner defining an interior. The outer wrapper and the inner liner may define a sealed insulating cavity therebetween that is under vacuum. A plurality of reinforcement brackets may be disposed on the outer wrapper. The plurality of reinforcement brackets are configured to prevent deformation of the cabinet during application of the vacuum to the insulating cavity.

5 Claims, 9 Drawing Sheets

(56) References Cited

U.S. PATENT DOCUMENTS

| | | | |
|---|---|---|---|
| 2,860,807 A | 11/1958 | Morton | |
| 3,446,881 A | 5/1969 | Poole | |
| 4,170,391 A | 10/1979 | Bottger | |
| 4,548,049 A * | 10/1985 | Rajgopal | F25D 21/04 62/275 |
| 4,550,576 A * | 11/1985 | Tate, Jr. | F25D 23/069 62/447 |
| 4,558,503 A * | 12/1985 | Wilson | B23P 15/26 29/446 |
| 4,606,112 A | 8/1986 | Jenkins et al. | |
| 4,632,470 A * | 12/1986 | Jenkins | F25D 23/062 312/138.1 |
| 4,706,363 A * | 11/1987 | Taylor, Jr. | F25D 23/067 312/265.5 |
| 4,862,577 A * | 9/1989 | Cordill | F25D 23/067 29/897.3 |
| 4,955,676 A | 9/1990 | Weaver et al. | |
| 5,349,832 A * | 9/1994 | Johnson | E05D 5/06 62/272 |
| 5,897,181 A | 4/1999 | Avendano et al. | |
| 6,773,082 B2 | 8/2004 | Lee | |
| 7,108,341 B2 | 9/2006 | Myers et al. | |
| 7,194,792 B2 | 3/2007 | Grace et al. | |
| 7,293,848 B2 | 11/2007 | Myers et al. | |
| 7,434,950 B2 | 10/2008 | Whitney | |
| 7,517,031 B2 * | 4/2009 | Laible | F25D 23/065 312/401 |
| 8,857,931 B2 | 10/2014 | Jung et al. | |
| 8,864,253 B2 | 10/2014 | Görz et al. | |
| 8,899,068 B2 | 12/2014 | Jung et al. | |
| 8,979,224 B2 | 3/2015 | Jang et al. | |
| 9,574,819 B2 | 2/2017 | Kang et al. | |
| 9,939,189 B2 | 4/2018 | Koo et al. | |
| 10,215,471 B2 | 2/2019 | Grimm et al. | |
| 10,274,247 B2 | 4/2019 | Jeong et al. | |
| 2016/0334159 A1 | 11/2016 | Hong et al. | |
| 2017/0370632 A1 | 12/2017 | Jeong et al. | |
| 2019/0128592 A1 | 5/2019 | Westlake et al. | |
| 2019/0316831 A1 | 10/2019 | Jung et al. | |
| 2020/0141629 A1 | 5/2020 | Seo | |
| 2021/0222944 A1 | 7/2021 | Harikrishnasamy et al. | |

FOREIGN PATENT DOCUMENTS

| | | | | |
|---|---|---|---|---|
| EP | 2789949 B1 | | 10/2014 | |
| ES | 2394419 B1 | | 12/2013 | |
| GB | 853100 | | 11/1960 | |
| GB | 1299515 A | | 7/1969 | |
| JP | 52109271 | | 8/1977 | |
| JP | H-04222378 A | * | 8/1992 | ............ F25D 23/06 |
| JP | 2000266458 A | | 9/2000 | |
| JP | 2001082866 A | | 3/2001 | |
| JP | 2007003182 A | | 1/2007 | |
| KR | 20000015520 U | | 8/2000 | |
| KR | 1020040102385 A | * | 12/2004 | |
| KR | 20070068985 A | | 7/2007 | |
| KR | 20090105331 A | | 10/2009 | |
| KR | 1020140124528 A | * | 10/2014 | ........... F25D 23/064 |
| WO | 2014071490 A1 | | 5/2014 | |
| WO | 2017068776 A1 | | 4/2017 | |
| WO | 2017180147 A1 | | 10/2017 | |
| WO | WO-2017192121 A1 | * | 11/2017 | ........... F25D 23/028 |
| WO | WO-2018024479 A1 | * | 2/2018 | ............ F25D 11/00 |

\* cited by examiner

CABINET REINFORCING ASSEMBLY

CROSS REFERENCE TO RELATED APPLICATION

The present application is a divisional of U.S. patent application Ser. No. 16/744,872, filed Jan. 16, 2020, now U.S. Pat. No. 11,150,008, entitled CABINET REINFORCING ASSEMBLY, the entire disclosure of which are incorporated herein by reference.

BACKGROUND OF THE DISCLOSURE

The present disclosure generally relates to insulation structures for appliances, and more specifically, to reinforcing assemblies for insulation structures for refrigerating appliances.

SUMMARY OF THE DISCLOSURE

According to one aspect of the present disclosure, a cabinet assembly for a refrigerating appliance includes a cabinet including an outer wrapper defining opposing first and second sidewalls, a rear wall coupling the first and second sidewalls and an access opening. An inner liner defines an upper compartment and a lower compartment. The outer wrapper and the inner liner define a sealed insulating cavity therebetween. The insulating cavity is under vacuum. A mullion is disposed between the upper compartment and the lower compartment and extends across the access opening. A plurality of reinforcement brackets are configured to prevent deformation of the cabinet during application of the vacuum to the insulating cavity and are disposed on the first and second sidewalls. The plurality of reinforcement brackets include a first reinforcement bracket including a length which is approximately the width of one of the first and second sidewalls and a second reinforcement bracket including one of an angled or nonlinear configuration.

According to another aspect of the present disclosure, a cabinet of an appliance includes an outer wrapper defining opposing first and second sidewalls, a rear wall coupling the first and second sidewalls and an access opening. An inner liner defines an interior. The outer wrapper and the inner liner define a sealed insulating cavity therebetween that is under vacuum. A plurality of reinforcement brackets are configured to prevent deformation of the cabinet during application of the vacuum to the insulating cavity and are disposed on the outer wrapper. The plurality of reinforcement brackets include a first reinforcement bracket including a length which is approximately the width of one of the first and second sidewalls and a second reinforcement bracket including a curved section.

According to yet another aspect of the present disclosure, a refrigerating appliance includes a cabinet including an outer wrapper defining opposing first and second sidewalls, a rear wall coupling the first and second sidewalls and an access opening. An inner liner defines an upper compartment and a lower compartment. The outer wrapper and the inner liner define a sealed insulating cavity therebetween that is under vacuum. A mullion is disposed between the upper compartment and the lower compartment and extends across the access opening. A mullion brace is positioned at the mullion. The mullion brace includes first and second transverse ends, wherein the first and second transverse ends are at least partially disposed on the first and second sidewalls, respectively.

These and other features, advantages, and objects of the present disclosure will be further understood and appreciated by those skilled in the art by reference to the following specification, claims, and appended drawings.

Figure 1:
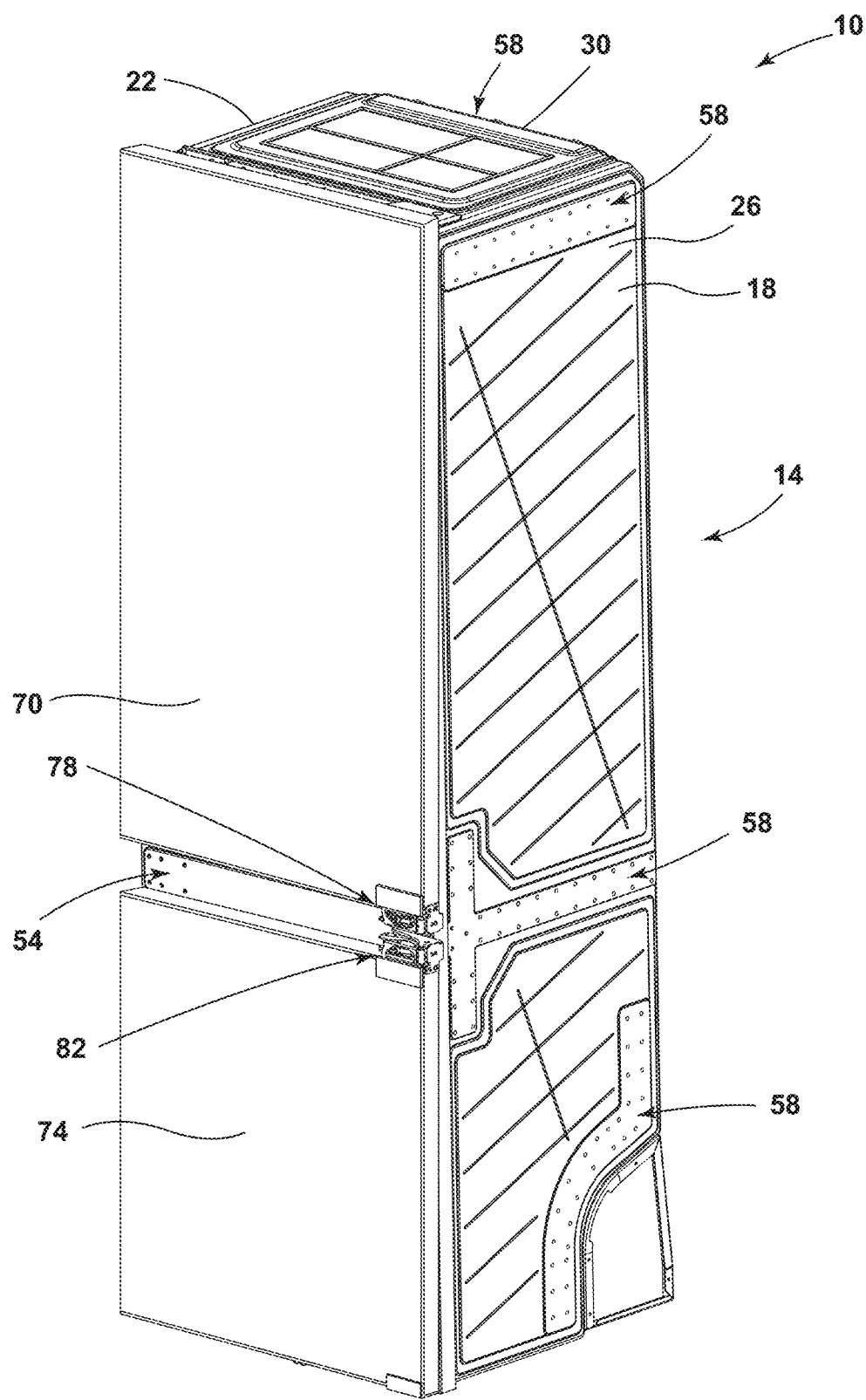
FIG. 1 is a front side perspective view of an appliance according to various aspects described herein.

The components in the figures are not necessarily to scale, emphasis instead being placed upon illustrating the principles described herein.

DETAILED DESCRIPTION

The present illustrated embodiments reside primarily in combinations of method steps and apparatus components related to a reinforcing assembly for refrigerating appliances. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally designates a cabinet assembly for a refrigerating appliance. The cabinet assembly 10 includes a cabinet 14 including an outer wrapper 18 defining opposing first and second sidewalls 22, 26 and a rear wall 30 coupling the first and second sidewalls 22, 26. The outer wrapper 18 also defines an access opening 34. An inner liner 38 defines an upper compartment 42 and a lower compartment 46. The outer wrapper 18 and the inner liner 38 define a sealed insulating cavity 50 therebetween. The insulating cavity 50 is under vacuum. A mullion 54 is disposed between the upper compartment 42 and the lower compartment 46 and extends across the access opening 34. At least two reinforcement brackets 58 are disposed on the outer wrapper 18 and include a length which is approximately the width of one of the first and second sidewalls 22, 26 and the rear wall 30. The at least two reinforcement brackets 58 are configured to prevent deformation of the cabinet 14 during application of the vacuum to the insulating cavity 50.

Referring now to FIG. 1, the cabinet assembly 10 is provided in an exemplary form that includes the cabinet 14, the outer wrapper 18, an upper door 70 and a lower door 74. As shown, the upper door 70 and the lower door 74 are mounted to the cabinet 14 with an upper hinge 78 and a lower hinge 82, respectively. The upper door 70 and the lower door 74 are opened and closed to selectively cover the access opening 34. However, it is within the scope of the disclosure for the cabinet 14 to include any suitable configuration, which may include a single door, a plurality of doors, French doors, drawers, etc. Accordingly, the inner liner 38 (FIG. 2) may include any suitable configuration of interior compartments. In some aspects, the cabinet 14 may be configured as a cabinet 14 for use in refrigerating appliance, such as a vacuum-insulated refrigerator.

Figure 2:
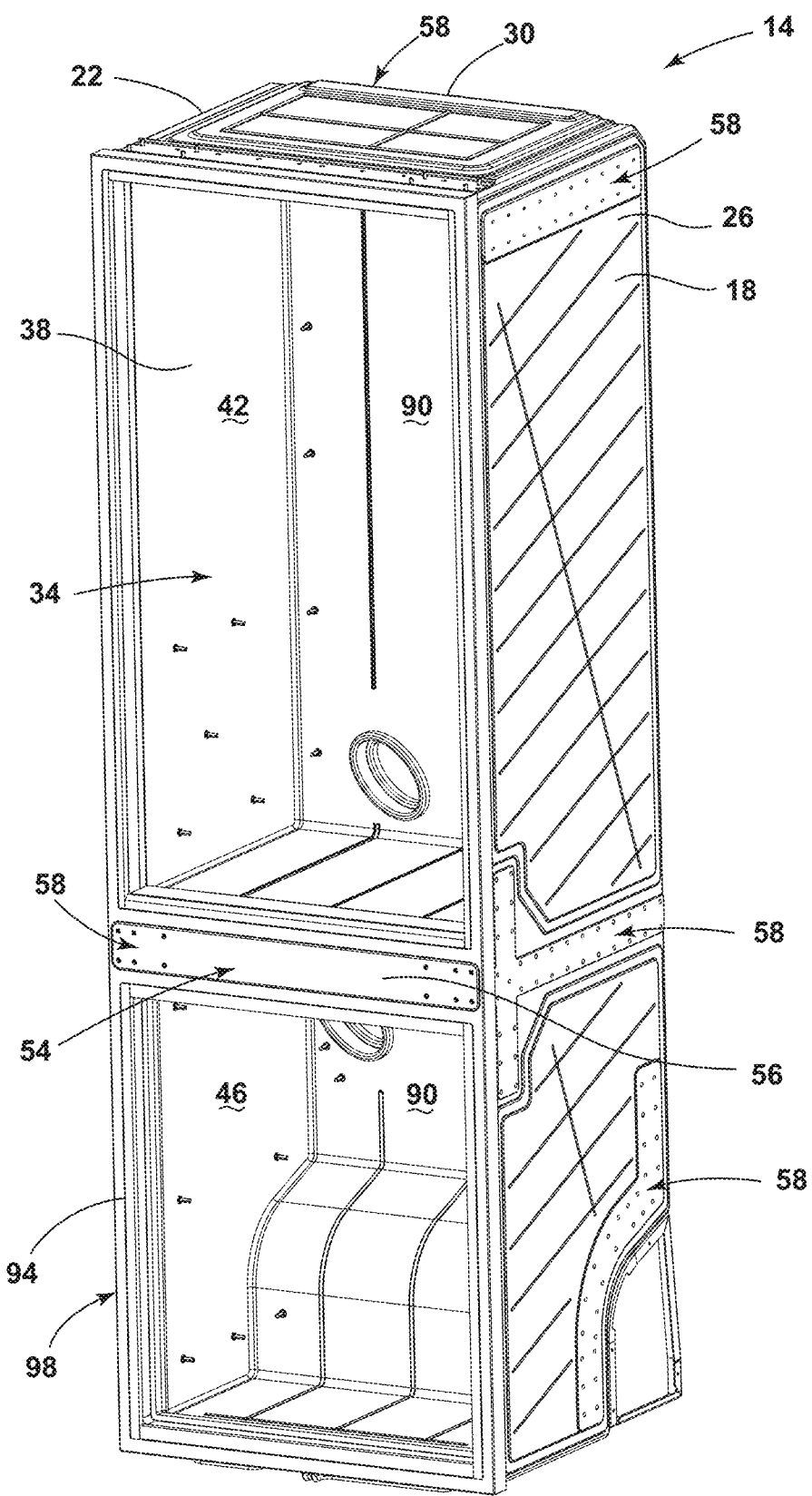
FIG. 2 is a front side perspective view of the appliance of FIG. 1 shown without door assemblies according to various aspects described herein.

As illustrated in FIG. 2, the cabinet 14 includes the outer wrapper 18 and inner liner 38. The outer wrapper 18 can be made of a metallic material, (e.g., aluminum, steel, etc.). A cabinet 14 reinforcing assembly may include a plurality of reinforcement brackets 58 disposed on the outer wrapper 18 that provide stiffening properties to the cabinet 14 for robust quality. The reinforcement brackets 58 may include any suitable material, such as a metal (e.g., aluminum, steel, etc.), which may be welded, or otherwise fastened, to the outer wrapper 18. In some aspects, the reinforcement brackets 58 are in the form of strips, or sheets, of steel. The inner liner 38 can be disposed or mounted within the outer wrapper 18, further defining an interior 90 of the cabinet 14. Typically, the inner liner 38 is attached, coupled, joined, or otherwise fastened to the outer wrapper 18 via an adhesive, insulating foam, bonding agent, mechanical fastener (e.g., rivets, screws, etc.), or another comparable approach. In some aspects, the inner liner 38 includes a partition, or the mullion 54 that divides the inner liner 38 into the upper compartment 42 and the lower compartment 46. As such, the mullion 54 may be disposed between the upper compartment 42 and the lower compartment 46 and extend across the access opening 34. One of the reinforcement brackets 58 may be in the form of a front reinforcing plate 56 positioned on the mullion 54. In some instances, the upper compartment 42 defines a refrigerated storage space, while the lower compartment 46 defines a freezer storage space.

As shown in the appliance illustrated in FIG. 2, a trim breaker 94 couples the outer wrapper 18 and the inner liner 38 at a periphery 98. The trim breaker 94 may be constructed from polymers, plastics, or other like materials. It may be beneficial for the trim breaker 94 to be made of a material that has at least some insulative properties. Additionally, it may be beneficial for the trim breaker 94 to be made from a resilient of pliable material.

The trim breaker 94 can be dimensioned to cover the entire periphery 98 and form a seal between the outer wrapper 18 and the inner liner 38 to form an insulation structure, which can be substantially air-tight. In some examples, the insulating cavity 50 (FIG. 7) defines a sealed space or gap between the outer wrapper 18 and the inner liner 38, which can be evacuated such that a pressure within the insulating cavity 50 is less than a pressure outside of the cabinet 14 and/or within the interior 90. The insulating cavity 50 may be evacuated until a pressure of about 1 mbar (0.1 kPa) is reached. In such examples, the insulation structure may be referred to as a vacuum-insulated structure. The term vacuum-insulated structure is not intended to refer to an absolute vacuum. Rather, the term vacuum-insulated structure is intended to refer to a structure that has an internal pressure that is below atmospheric pressure. For example, the sealed insulating cavity 50 may be under vacuum and less than about 50 kPa, less than about 20 kPa, less than about 5 kPa, greater than 0 kPa and/or combinations of ranges thereof. In various examples, the insulating cavity 50 is filled with an insulative material (e.g. foam, beads, etc.) prior to the evacuation of the space or gap. Optionally, the insulating cavity 50 may be filled with the insulative material rather than evacuating the space or gap.

Figure 3:
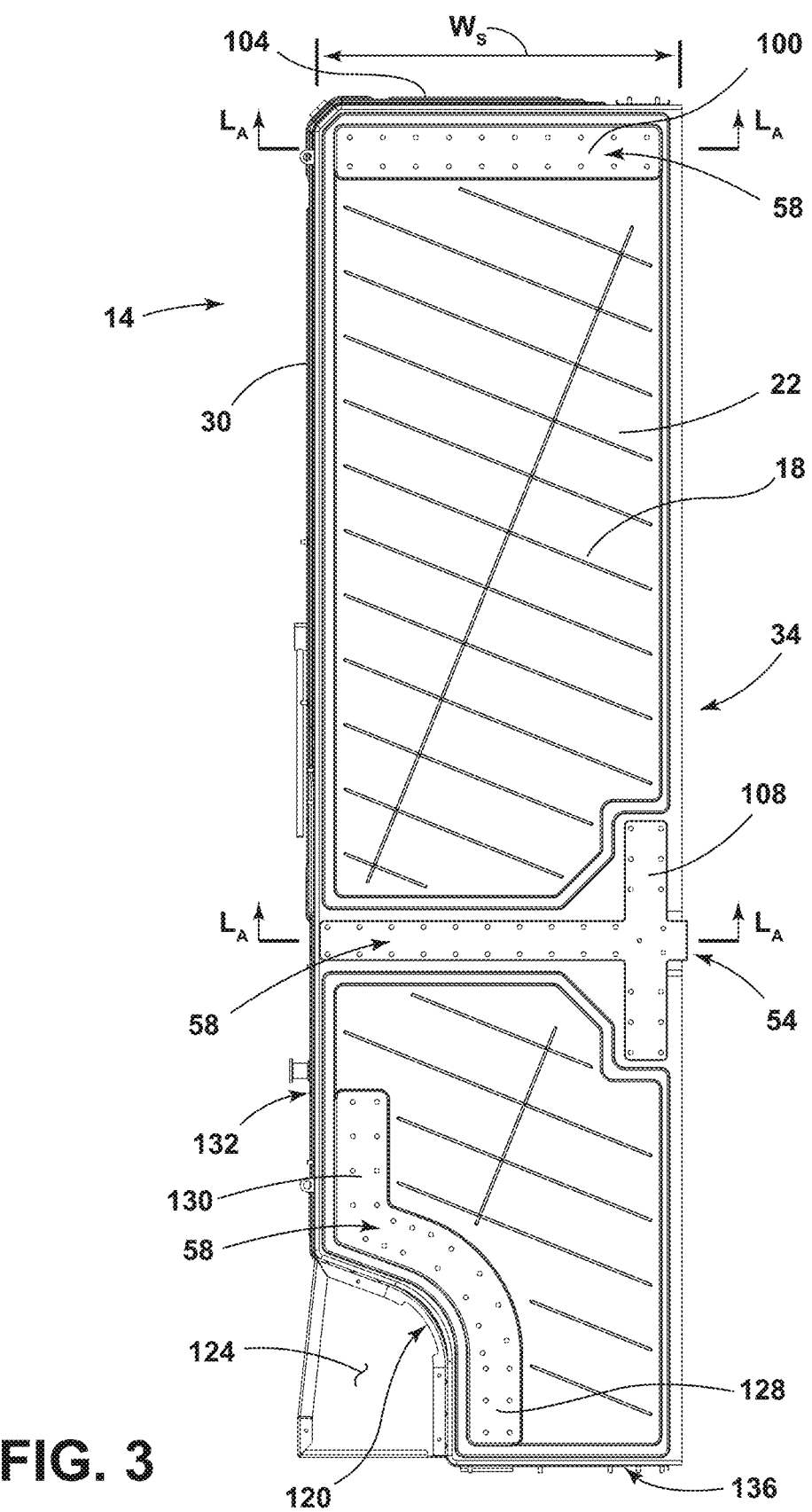
FIG. 3 is a side elevation view of the appliance of FIG. 2.

FIG. 3 is directed to the illustrative first sidewall 22. The description with respect to the first sidewall 22 also applies to the second sidewall 26. As shown, the first sidewall 22 includes a width, $w_s$. The reinforcement brackets 58 may include a length that is similar to, or approximately, the width, $w_s$. In this way, the reinforcement brackets 58 may extend along at least 80% or more, or 90% or more, of the width, $w_s$ of the first sidewall 22. Two of the illustrative reinforcement brackets 58 are vertically spaced on the first sidewall 22 such that longitudinal axes, $L_A$, of the reinforcement brackets 58 are substantially parallel with one another. As illustrated, one of the reinforcement brackets 58 includes an upper side section 100. The upper side section 100 may be disposed proximate an upper edge 104 of the first sidewall 22. In some examples, the upper side section 100 is substantially rectangular. Additionally, at least one of the reinforcement brackets 58 may include an intermediate section 108. In some examples, the intermediate section 108 includes a T-shaped configuration (i.e. a T-bracket having an angled configuration between two portions of the bracket) and is disposed proximate the mullion 54. As the description with respect to the first sidewall 22 also applies to the second sidewall 26, the cabinet 14 may include first and second upper side sections 100 and first and second intermediate sections 108 disposed on first and second sidewalls 22, 26, respectively.

Still referring to FIG. 3, the sidewall 22 may include a curved lower edge 120 configured to accommodate a machine compartment 124 thereunder. At least one of the reinforcement brackets 58 may include a lower curved section 128 and an upper linear section 130, which may be vertically spaced from the upper side section 100 and the intermediate section 108. The lower curved section 128 may define a nonlinear configuration. As illustrated, the curved section 128 extends along the curved lower edge 120. In some aspects, the upper linear section 130 extends vertically along a rear edge 132 of the sidewall 22 and the lower curved section 128 curves along the curved lower edge 120 towards a bottom edge 136 of the sidewall 22. As the description with respect to the first sidewall 22 also applies to the second sidewall 26, the cabinet 14 may include first and second lower reinforcement brackets 58 that extend along the curved lower edge 120 of the first and second sidewalls 22, 26.

Figure 4:
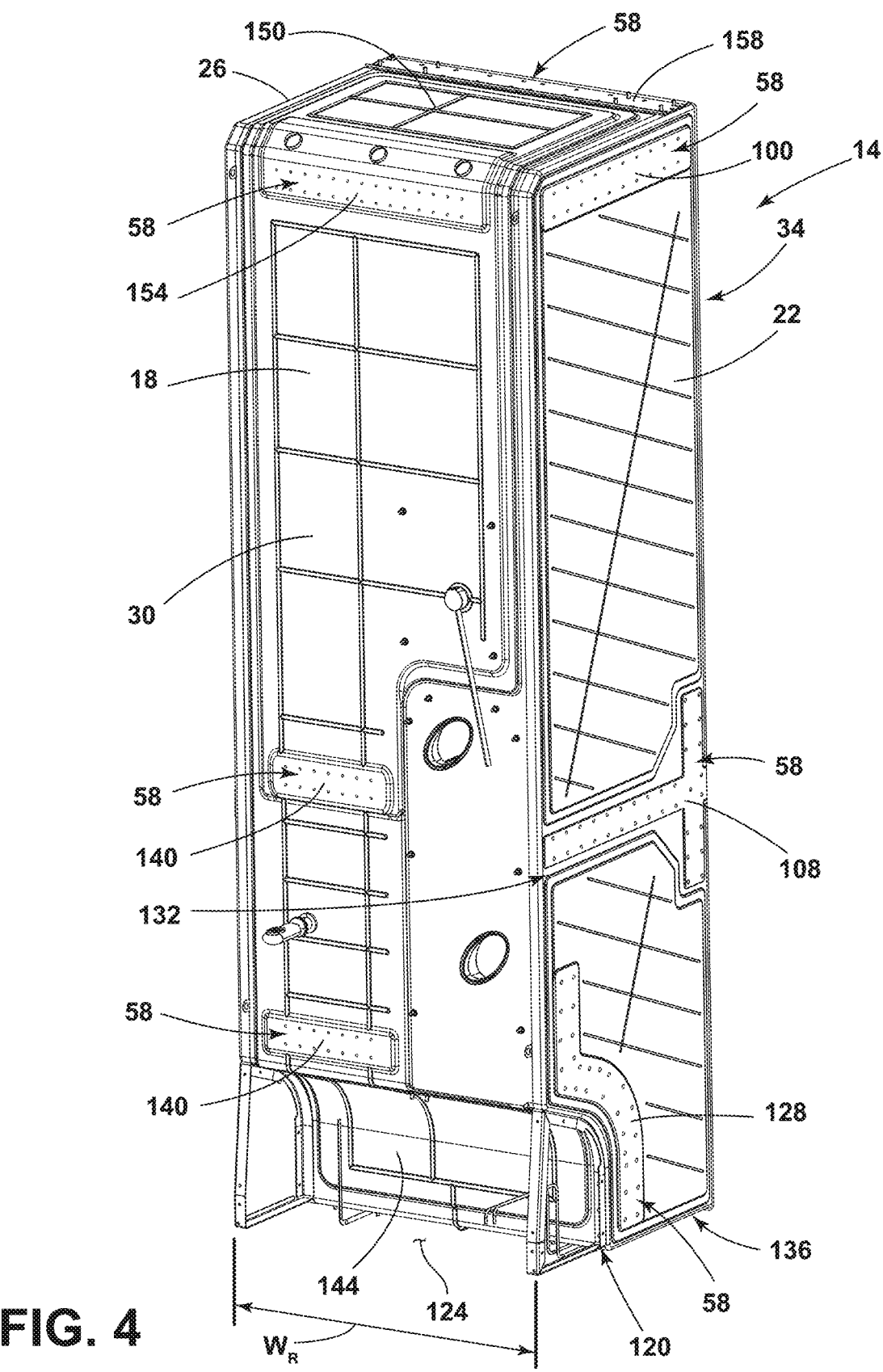
FIG. 4 is a rear side perspective view of the appliance of FIG. 2.

Referring now to FIG. 4, the rear wall 30 may include a plurality of reinforcement brackets 58. As shown, the rear wall 30 includes a width, $w_R$. In some aspects, a pair of vertically spaced and substantially parallel rear reinforcement brackets 140 are disposed on the rear wall 30. The rear reinforcement brackets 140 may be substantially rectangular and may extend along a portion of the width, $w_R$. It is contemplated that the rear reinforcement brackets 140 extend along at least 80% or more of the width, $w_R$, or along less than 80% of the width, $w_R$. At least one of the rear reinforcement brackets 140 may be disposed proximate a curved lower portion 144 of the rear wall 30, which is configured to accommodate the machine compartment 124.

As illustrated in FIG. 4, the cabinet 14 further includes a top wall 150. The top wall 150 couples the first and second sidewalls 22, 26 and the rear wall 30 at an upper end of the cabinet 14. As shown, the upper side section 100 is disposed proximate the top wall 150. In some examples, at least one reinforcement bracket 58 is defined as a top, or upper, reinforcement bracket 154 that is operably coupled to the rear wall 30 and the top wall 150. The illustrative top reinforcement bracket 154 includes a generally curved configuration that may wrap around at least a portion of the upper corner of the appliance 10, but is not limited to such. It is also contemplated that the top reinforcement bracket 154 may include a generally 90° angle to accommodate the edge between the top wall 150 and the rear wall 30. Furthermore, at least one reinforcement bracket 58 may include a second top, or upper, reinforcement bracket 158 operably coupled to the top wall 150 proximate the access opening 34. The first and second top reinforcement brackets 154, 158 may include lengths of at least 80% or more of the width, $w_R$, which is generally the same width as the top wall 150.

Figure 5:
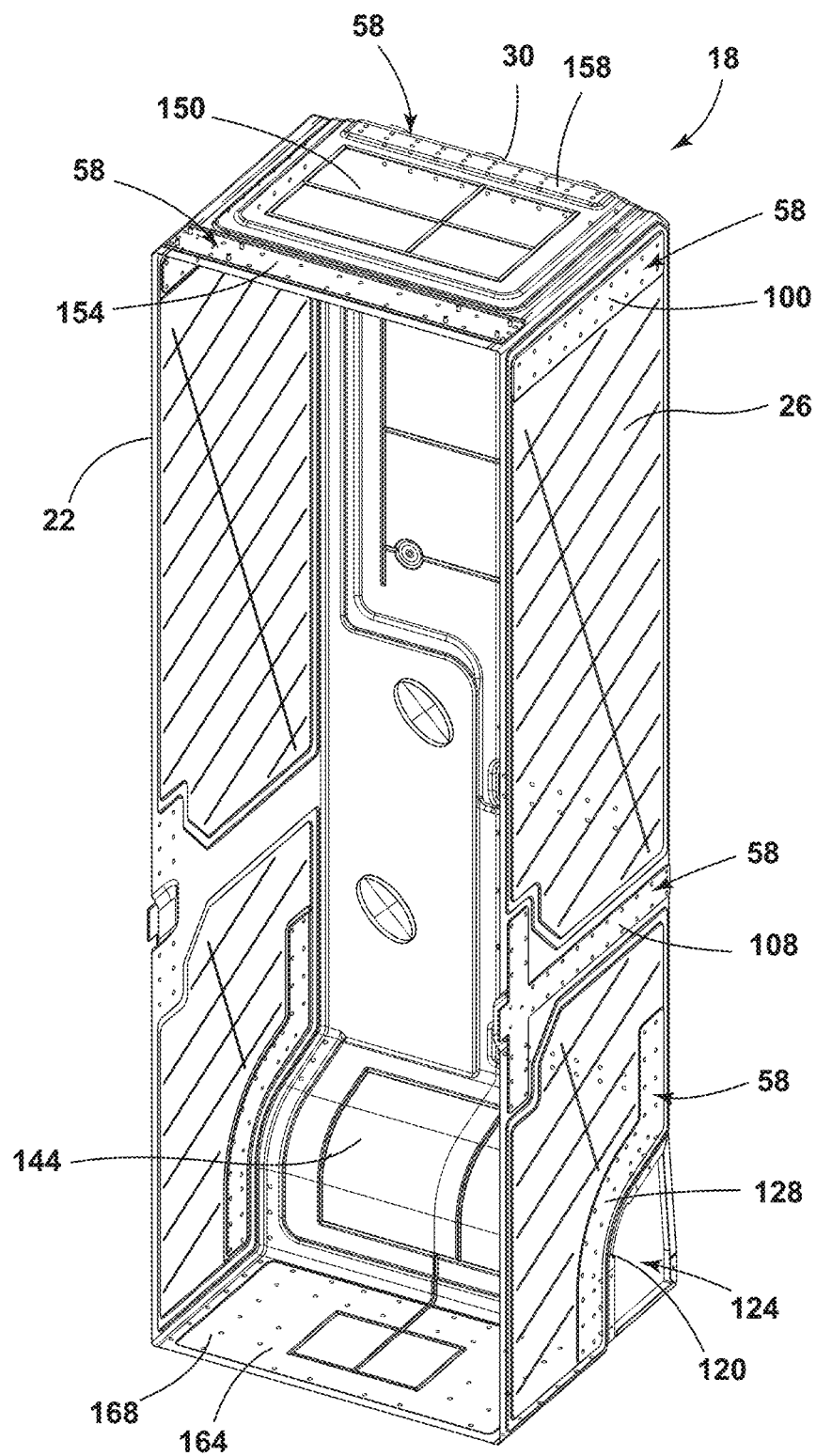
FIG. 5 is a top front perspective view of an outer wrapper according to various aspects described herein.

As illustrated in FIG. 5, the cabinet 14 further includes a bottom wall 164. The bottom wall 164 couples the first and second sidewalls 22, 26 and the rear wall 30 at a lower end of the cabinet 14. The curved lower edge 120 of the first and second sidewalls 22, 26 and the curved lower portion 144 of the rear wall 30 may be disposed proximate the bottom wall 164. In some aspects, the bottom wall 164 includes a bottom plate 168 configured to reinforce the bottom wall 164.

Figure 6:
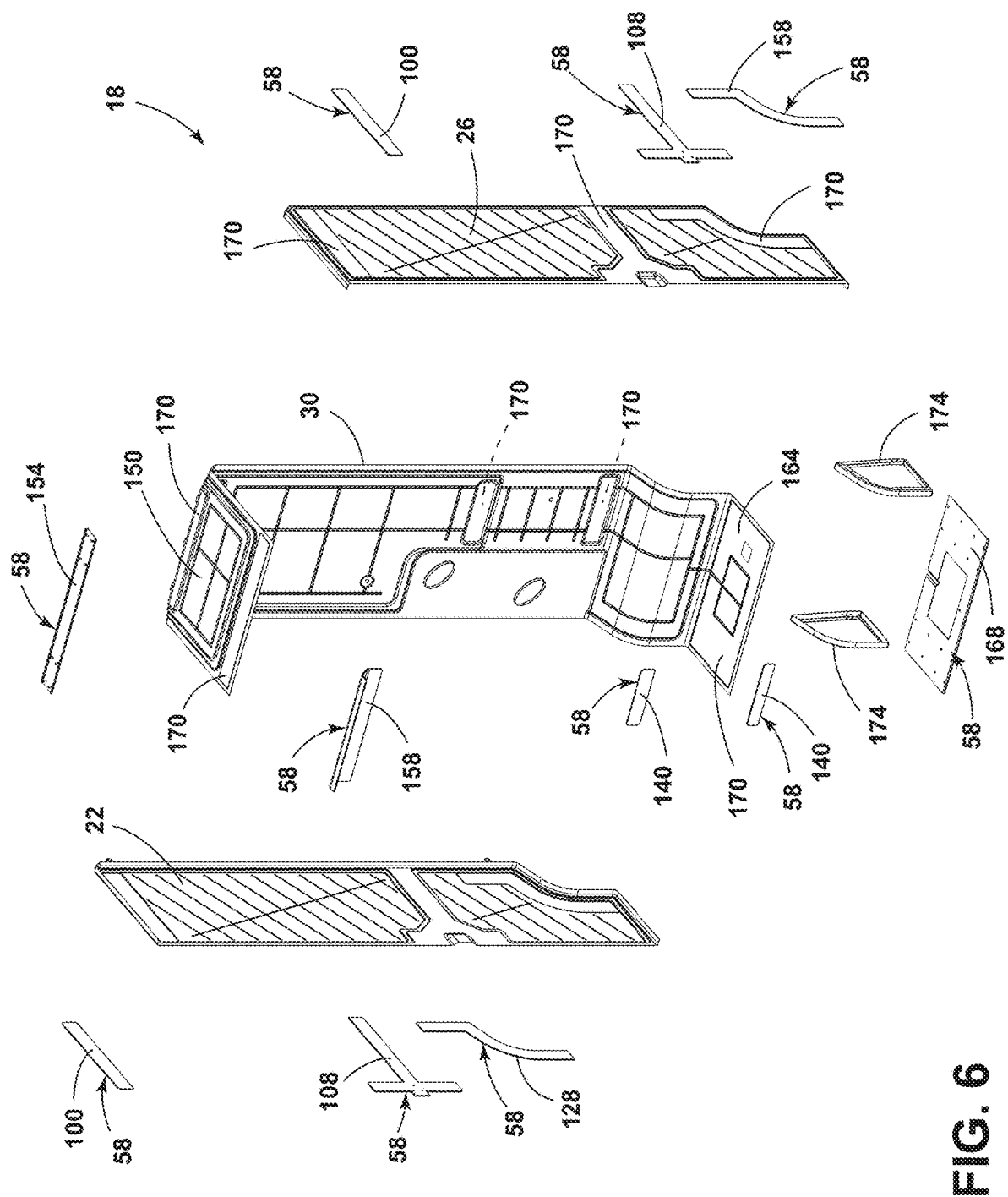
FIG. 6 is an exploded top perspective view of the outer wrapper of FIG. 5.

Referring now to FIG. 6, an exploded view of the outer wrapper 18 is illustrated. In some instances, the top wall 150, rear wall 30 and bottom wall 164 are configured as a singular piece, but are not limited to such. As illustrated, the outer wrapper 18 includes grooves, or indentations 170, configured to receive the reinforcement brackets 58. The indentations 170 are dimensioned such that the corresponding reinforcement bracket 58 fits within the indentations 170. Accordingly, the indentations 170 may include shapes generally similar to the shapes of the corresponding reinforcement bracket 58. Additionally, the cabinet assembly 10 may include support frames 174 configured to support the curved lower portion 144 of the rear wall 30.

Figure 7:
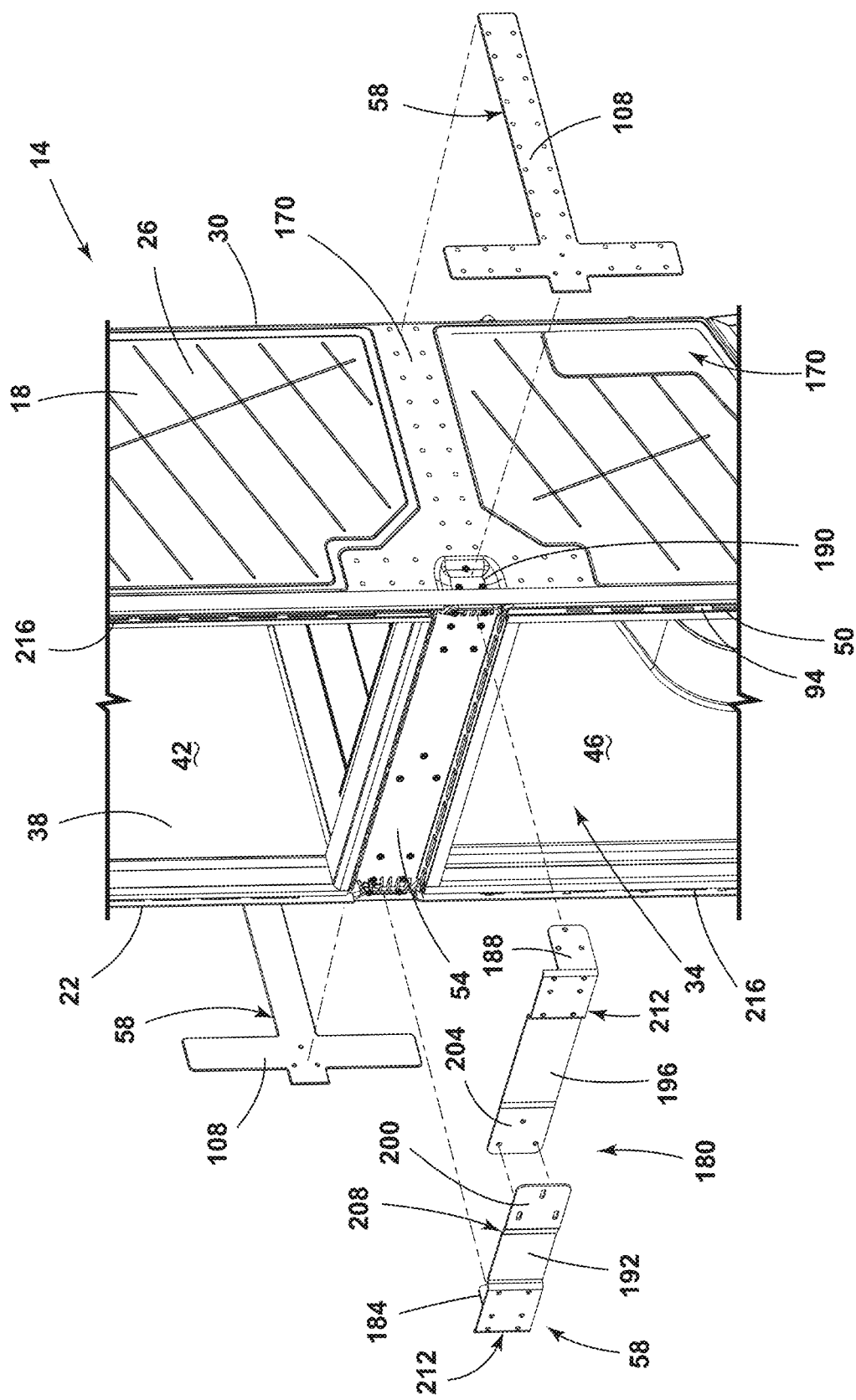
FIG. 7 is an enlarged partial front side perspective and exploded view of the appliance of FIG. 2.

FIG. 7 is directed to the mullion 54 of the cabinet 14. A mullion bracket, or mullion brace 180, may be positioned at the mullion 54 and extend across the access opening 34. As illustrated, the mullion brace 180 includes first and second transverse ends 184, 188, which are at least partially disposed on the first and second sidewalls 22, 26, respectively, when assembled. Accordingly, the first and second transverse ends 184, 188 may be in the form of engagement portions, which may be angled, or bent to abut and/or couple the first and second sidewalls 22, 26. Furthermore, the indentations 170 corresponding to the intermediate sections 108 may include a recess defining a gap between the first and second transverse ends 184, 188 and the first and second sidewalls 22, 26.

Still referring to FIG. 7, the mullion brace 180 may include a first bracket 192 and a second bracket 196. The two-piece mullion brace 180 allows for adjustability in the width direction. However, it is contemplated that the mullion brace 180 is a single piece. As illustrated, the first bracket 192 includes a first planar end 200, which may be generally orthogonal to the first transverse end 184, and the second bracket 196 includes a second planar end 204, which may be generally orthogonal to the second transverse end 188. The first and second planar ends 200, 204 may at least partially overlap. Moreover, at least one of the first and second planar ends 200, 204 may include an angled portion 208 such that one of the first and second planar ends 200, 204 overlaps the other of the first and second planar ends 200, 204. In this way, the first and second brackets 192, 196 may be substantially flush, or even, with the mullion 54. The first and second planar ends 200, 204 may be coupled via any suitable technique, including the use of fasteners, welding, adhesives, etc.

As illustrated, the mullion brace 180 includes raised areas, or portions 212 proximate access opening edges 216 of the first and second sidewalls 22, 26. The raised portions 212 are positioned proximate the first and second transverse ends 184, 188. In some instances, at least one of the upper and lower door hinges 78, 82 (FIG. 1) are coupled to the raised portion 212, which may include the pair of hinges 78, 82.

Figure 8:
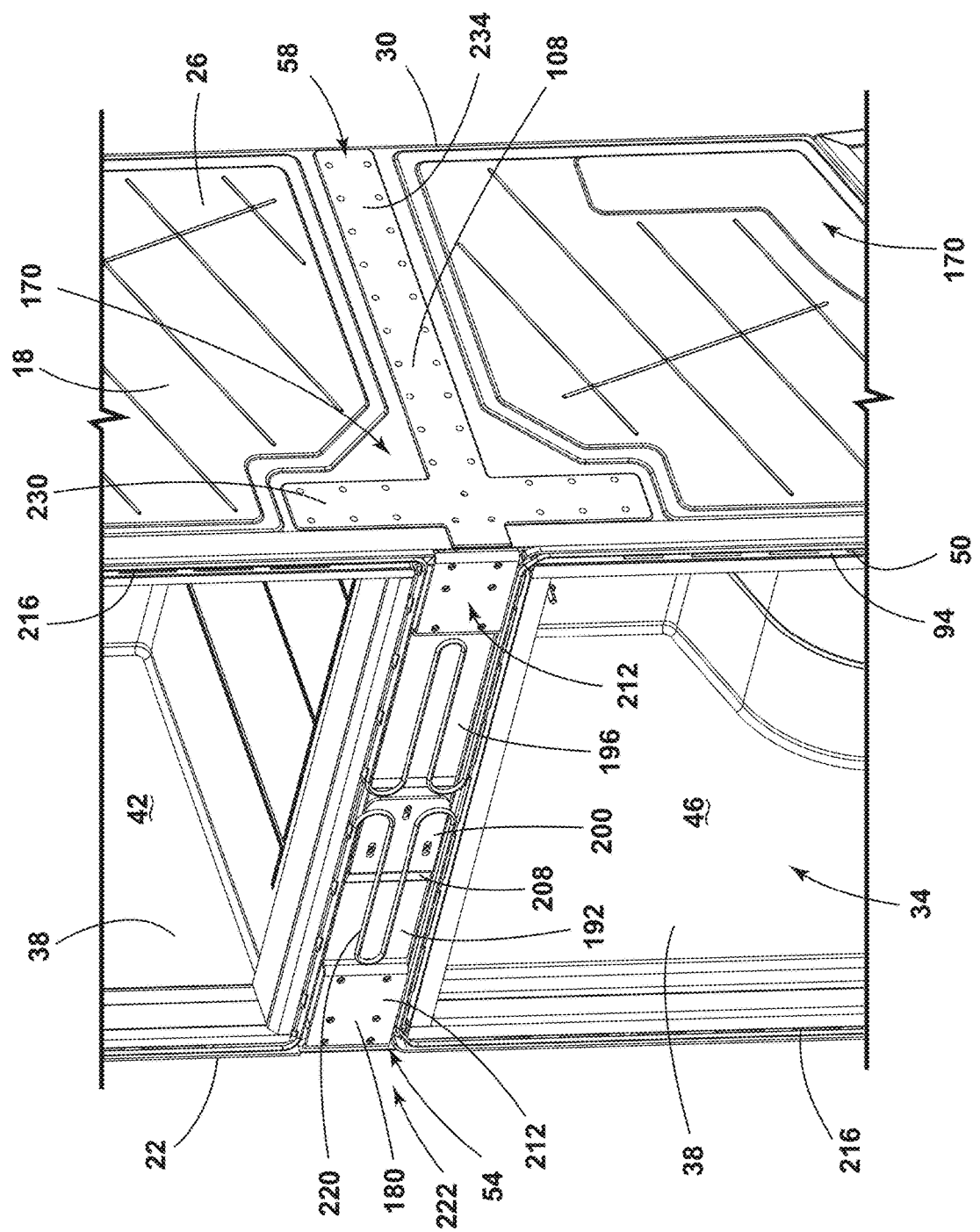
FIG. 8 is an enlarged partial front side perspective view of the appliance of FIG. 2.

FIG. 8 illustrates the mullion brace 180 coupled to the mullion 54. In some examples, a heat loop 220 may be disposed over the mullion brace 180. In the illustrated construction, the heat loop 220 is sized to fit between the two raised portions 212 of the mullion brace 180, which may result in an even front surface for coupling the front reinforcing plate 56 (FIG. 2). The heat loop 220 keeps the temperature of the surface of the mullion 54 near ambient temperature to prevent condensation.

In some aspects, the upper compartment 42 and the lower compartment 46 are vertically spaced and define a compartment interface 222 therebetween, extending around the cabinet 14. The compartment interface 222 may be defined as a horizontal plane, or a portion, of the cabinet 14 at which the upper compartment 42 and the lower compartment 46 converge. Accordingly, the mullion brace 180 may be positioned along a portion of the compartment interface 222 and extend across the access opening 34.

As previously discussed, the intermediate sections 108 of the reinforcement brackets 58 may include a T-shaped construction thereby defining a T-bracket. The T-brackets may at least partially overlap the first and second transverse ends 184, 188 of the mullion brace 180. The illustrative T-bracket includes a vertical portion 230 and a horizontal portion 234. In some instances, the vertical portion 230 is disposed across the compartment interface 222 adjacent the access opening edge 216 and the horizontal portion 234 is disposed along the compartment interface 222, or horizontal plane, extending towards the rear wall 30. In this way, the vertical portion 230 may be at a generally right angle to the horizontal portion 234, but is not limited to such. It is contemplated that the vertical portion 230 is spaced from the access opening edge 216 and the horizontal portion 234 extends past the vertical portion 230 such that the horizontal portion 234 is closer to the access opening edge 216 than the vertical portion 230. Furthermore, the illustrative vertical portion 230 includes a first height greater than a second height of the pair of hinges 78, 82. In other words, the vertical portion 230 extends substantially above and below the pair of hinges 78, 82. Accordingly, the T-brackets may prevent sagging and deformation of the cabinet 14 from various forces experienced in the area adjacent the pair of hinges 78, 82.

Figure 9:
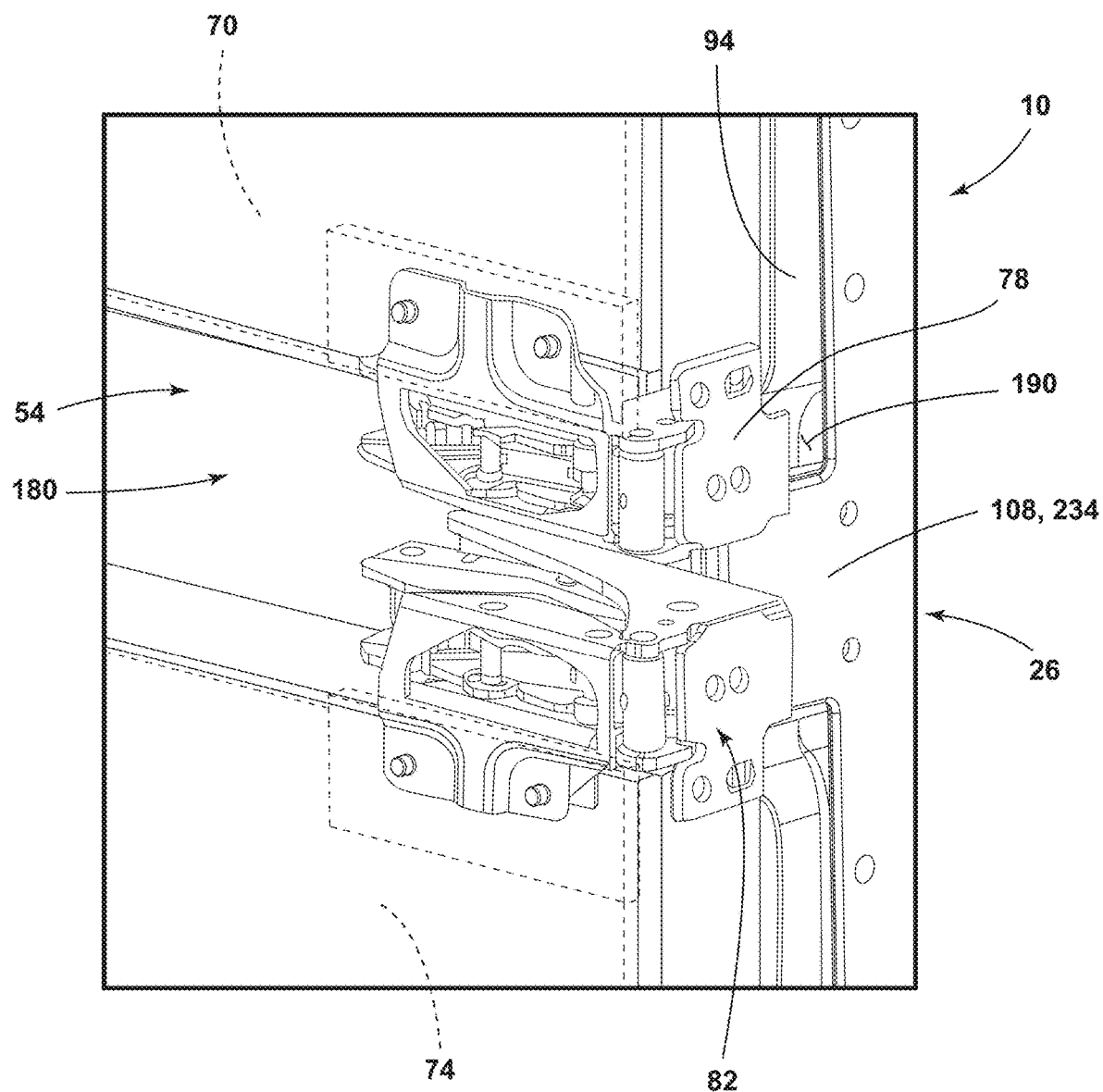
FIG. 9 is an enlarged partial front perspective view of the appliance of FIG. 1.

Referring now to FIG. 9, the recess 190 which defines the gap between the first and second transverse ends 184, 188 (FIG. 7) and the first and second sidewalls 22, 26 may accommodate at least a portion of the trim breaker 94. In some instances, the trim breaker 94 includes multiple components such that some of the components of the trim breaker 94 are positioned underneath the T-brackets and other components are positioned above the T-brackets, which is best seen in FIG. 2. Accordingly, at least a portion of the trim breaker 94 may be jogged to fit within the recess 190. Jogging the trim breaker 94 for positioning underneath the transverse ends 184, 188 and the T-brackets provide space to mount the upper and lower door hinges 78, 82. Thus, the upper and lower door hinges 78, 82 can be positioned exterior of the cabinet 14.

According to one aspect of the present disclosure, a cabinet assembly for a refrigerating appliance includes a cabinet including an outer wrapper defining opposing first and second sidewalls, a rear wall coupling the first and second sidewalls and an access opening. An inner liner defines an upper compartment and a lower compartment. The outer wrapper and the inner liner define a sealed insulating cavity therebetween. The insulating cavity is under vacuum. A mullion is disposed between the upper compartment and the lower compartment and extends across the access opening. A plurality of reinforcement brackets are configured to prevent deformation of the cabinet during application of the vacuum to the insulating cavity and are disposed on the first and second sidewalls. The plurality of reinforcement brackets include a first reinforcement bracket including a length which is approximately the width of one of the first and second sidewalls and a second reinforcement bracket including one of an angled or nonlinear configuration.

According to another aspect, the first and second sidewalls include a curved lower edge configured to accommodate a machine compartment thereunder and the plurality of reinforcement brackets further include first and second lower reinforcement brackets extending along the curved lower edge of the first and second sidewalls, respectively.

According to another aspect, at least two reinforcement brackets of the plurality of reinforcement brackets are vertically spaced on one of the first and second sidewalls and longitudinal axes of the at least two reinforcement brackets are substantially parallel with one another.

According to another aspect, one of the at least two reinforcement brackets includes a T-shaped configuration and is disposed on the one of the first and second sidewalls proximate the mullion.

According to another aspect, the outer wrapper further defines a top wall and the plurality of reinforcement brackets further include a first upper reinforcement bracket operably coupled with the rear wall and the top wall and a second upper reinforcement bracket operably coupled to one of the first and second sidewalls proximate the top wall.

According to another aspect, a pair of vertically spaced and substantially parallel rear reinforcement brackets are coupled with the rear wall.

According to another aspect, the outer wrapper includes grooves dimensioned to receive the plurality of reinforcement brackets.

According to another aspect, a front reinforcing plate is positioned on the mullion and extends substantially across the width of the access opening.

According to one aspect of the present disclosure, a cabinet of an appliance includes an outer wrapper defining opposing first and second sidewalls, a rear wall coupling the first and second sidewalls and an access opening. An inner liner defines an interior, wherein the outer wrapper and the inner liner define a sealed insulating cavity therebetween that is under vacuum. A plurality of reinforcement brackets are configured to prevent deformation of the cabinet during application of the vacuum to the insulating cavity and are disposed on the outer wrapper. The plurality of reinforcement brackets include a first reinforcement bracket including a length which is approximately the width of one of the first and second sidewalls and a second reinforcement bracket including a curved section.

According to another aspect, the first and second sidewalls include a curved lower edge configured to accommodate a machine compartment thereunder and the plurality of reinforcement brackets further comprise first and second lower reinforcement brackets extending along the curved lower edge of the first and second sidewalls, respectively.

According to another aspect, the plurality of reinforcement brackets are vertically spaced on one of the first and second sidewalls.

According to another aspect, the outer wrapper further defines a top wall and the plurality of reinforcement brackets further include a first upper reinforcement bracket coupled with the rear wall and the top wall and a second upper reinforcement bracket coupled to one of the first and second sidewalls proximate the top wall.

According to another aspect, the plurality of reinforcement brackets include a pair of vertically spaced and substantially parallel rear reinforcement brackets coupled with the rear wall.

According to one aspect of the present disclosure, a refrigerating appliance includes a cabinet including an outer wrapper defining opposing first and second sidewalls, a rear wall coupling the first and second sidewalls and an access opening. An inner liner defines an upper compartment and a lower compartment, wherein the outer wrapper and the inner liner define a sealed insulating cavity therebetween that is under vacuum. A mullion is disposed between the upper compartment and the lower compartment and extends across the access opening. A mullion brace is positioned at the mullion. The mullion brace includes first and second transverse ends, wherein the first and second transverse ends are at least partially disposed on the first and second sidewalls, respectively.

According to another aspect, the mullion brace further includes a first bracket and a second bracket, and the first bracket and the second bracket include the first and second transverse ends, respectively.

According to another aspect, the first and second brackets include first and second planar ends, which at least partially overlap.

According to another aspect, one of the first and second brackets includes an angled portion such that one of the first and second planar ends corresponding to the one of the first and second brackets overlaps the other of the first and second planar ends.

According to another aspect, the mullion brace further comprises a raised portion and the raised portion is proximate an access opening edge of one of the first and second sidewalls.

According to another aspect, at least one door hinge is coupled to the raised portion.

According to another aspect, the mullion brace further includes a first bracket and a second bracket having overlapping planar ends and the first bracket and the second bracket include the first and second transverse ends, respectively, and a raised portion proximate an access opening edge of one of the first and second sidewalls.

According to one aspect of the present disclosure, a cabinet assembly for a refrigerating appliance includes a cabinet including an outer wrapper defining opposing first and second sidewalls, a rear wall coupling the first and second sidewalls and an access opening. An inner liner defines an upper compartment and a lower compartment, wherein the outer wrapper and the inner liner define an insulating cavity therebetween that is under vacuum. First and second T-brackets are coupled to the first and second sidewalls, respectively. The first and second T-brackets each include a vertical portion and a horizontal portion. The upper compartment and the lower compartment define a compartment interface. The vertical portions are disposed across the compartment interface adjacent the access opening and the horizontal portions are disposed along the compartment interface and extend towards the rear wall.

According to another aspect, the vertical portions of the first and second T-brackets are spaced from access opening edges of the first and second sidewalls.

According to another aspect, the horizontal portions of the first and second T-brackets extend past the vertical portions such that the horizontal portions are closer to the access opening edges than the vertical portions.

According to another aspect, a mullion bracket is positioned along the compartment interface and extends across the access opening, wherein the mullion bracket includes first and second ends having engagement portions configured to couple with the first and second sidewalls and the first and second T-brackets at least partially overlap the first and second ends, respectively.

According to another aspect, one of the first and second ends of the mullion bracket is coupled to a pair of hinges and the vertical portion of the corresponding one of the first and second T-brackets includes a first height greater than a second height of the pair of hinges.

According to another aspect, the outer wrapper includes grooves dimensioned to receive the first and second T-brackets.

According to another aspect, the grooves include a recess dimensioned to receive the end of a mullion bracket.

According to another aspect, the first and second T-brackets are welded to the outer wrapper.

According to one aspect of the present disclosure, a cabinet of an appliance includes an outer wrapper defining opposing sidewalls, a rear wall coupling the first and second sidewalls and an access opening. An inner liner defines an upper compartment and a lower compartment. A mullion bracket is disposed in a horizontal plane between the upper compartment and the lower compartment. A T-bracket is coupled to one of the sidewalls. The T-bracket includes a vertical portion and a horizontal portion. The vertical portion is disposed adjacent the access opening and the horizontal portion is disposed along the horizontal plane including the mullion bracket and extends towards the rear wall approximately the width of the one of the sidewalls.

According to another aspect, the outer wrapper and the inner liner define a sealed insulating cavity therebetween and the insulating cavity defines an at least partial vacuum.

According to another aspect, the vertical portion is spaced from an access opening edge of the one of the sidewalls.

According to another aspect, the horizontal portion of the T-bracket extends past the vertical portion such that the horizontal portion is closer to the access opening edge than the vertical portion.

According to another aspect, the mullion bracket includes an end having an engagement portion configured to couple with the one of the sidewalls and the T-bracket at least partially overlaps the engagement portion.

According to one aspect of the present disclosure, a refrigerating appliance includes a cabinet including an outer wrapper defining opposing first and second sidewalls, a rear wall coupling the first and second sidewalls and an access opening. An inner liner defines an upper compartment and a lower compartment. The outer wrapper and the inner liner define a sealed insulating cavity therebetween that is under vacuum. At least one T-bracket is coupled to one of the first and second sidewalls. The at least one T-bracket includes a vertical portion and a horizontal portion. The upper compartment and the lower compartment are vertically spaced and include a horizontal plane therebetween. The vertical portion is disposed across the horizontal plane and the horizontal portion extends towards the rear wall along the horizontal plane.

According to another aspect, the at least one T-bracket includes first and second T-brackets coupled to the first and second sidewalls, respectively.

According to another aspect, the vertical portion of the T-bracket is spaced from an access opening edge of the one of the first and second sidewalls.

According to another aspect, the horizontal portion of the T-bracket extends past the vertical portion such that the horizontal portion is closer to the access opening edge than the vertical portion.

According to another aspect, a mullion bracket extends across the access opening between the upper compartment and the lower compartment, wherein the mullion bracket includes an end having an engagement portion configured to couple with the one of the first and second sidewalls and the at least one T-bracket at least partially overlaps the end of the mullion bracket.

According to another aspect, the outer wrapper includes a groove dimensioned to receive the at least one T-bracket.

According to another aspect, the at least one T-bracket is welded to the outer wrapper.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A refrigerating appliance comprising:
a cabinet comprising:
   an outer wrapper defining opposing first and second sidewalls, a rear wall coupling the first and second sidewalls, and an access opening;
   an inner liner defining an upper compartment and a lower compartment, wherein the outer wrapper and the inner liner define a sealed insulating cavity therebetween;
   a mullion disposed between the upper compartment and the lower compartment and extending across the access opening; and
   a mullion brace positioned at the mullion, the mullion brace including a first bracket and a second bracket having overlapping planar ends, the first bracket and the second bracket including first and second transverse ends, respectively, wherein the first and second transverse ends are at least partially disposed on the first and second sidewalls, respectively.

2. The refrigerating appliance of claim 1, wherein one of the first and second brackets includes an angled portion such that one of the first and second planar ends corresponding to the one of the first and second brackets overlaps the other of the first and second planar ends.

3. The refrigerating appliance of claim 1, wherein the mullion brace further comprises a raised portion, the raised portion proximate an access opening edge of one of the first and second sidewalls.

4. The refrigerating appliance of claim 3, wherein at least one door hinge is coupled to the raised portion.

5. The refrigerating appliance of claim 1, wherein the mullion brace further comprises:
   a raised portion proximate an access opening edge of one of the first and second sidewalls.

* * * * *